US009718437B2

(12) United States Patent
Liu

(10) Patent No.: US 9,718,437 B2
(45) Date of Patent: Aug. 1, 2017

(54) WINDER, A TORSION BAR, A REEL, END COVERS AND A SAFETY BELT ASSEMBLY USED FOR A FORCE LIMITING SAFETY BELT

(71) Applicant: HELIA TECHNOLOGY (SHANGHAI) CO., LTD, Shanghai (CN)

(72) Inventor: Xuejun Liu, Shanghai (CN)

(73) Assignee: HELIA TECHNOLOGY (SHANGHAI) CO., LTD, Shanghai (CN)

( * ) Notice: Subject to any disclaimer, the term of this patent is extended or adjusted under 35 U.S.C. 154(b) by 106 days.

(21) Appl. No.: 14/421,457

(22) PCT Filed: Aug. 23, 2013

(86) PCT No.: PCT/CN2013/082175
§ 371 (c)(1),
(2) Date: Feb. 13, 2015

(87) PCT Pub. No.: WO2014/032546
PCT Pub. Date: Mar. 6, 2014

(65) Prior Publication Data
US 2015/0210247 A1 Jul. 30, 2015

(30) Foreign Application Priority Data

Aug. 27, 2012 (CN) .......................... 2012 1 0308979
Aug. 27, 2012 (CN) .......................... 2012 1 0309026
(Continued)

(51) Int. Cl.
*B60R 22/34* (2006.01)

(52) U.S. Cl.
CPC .......... *B60R 22/3413* (2013.01); *B60R 22/34* (2013.01); *B60R 2022/3402* (2013.01); *B60R 2022/3427* (2013.01)

(58) Field of Classification Search
CPC ........................ B60R 22/34; B60R 2022/3402
See application file for complete search history.

(56) References Cited

U.S. PATENT DOCUMENTS 5,785,269 A * 7/1998 Miller, III ........... B60R 22/3413
242/379.1
5,799,893 A 9/1998 Miller, III et al.
(Continued)

FOREIGN PATENT DOCUMENTS

CN 102837664 A 12/2012
CN 202743196 U 2/2013
(Continued)

*Primary Examiner* — Sang Kim
(74) *Attorney, Agent, or Firm* — Gokalp Bayramoglu

(57) ABSTRACT

The present invention provides a winder used for a force limiting safety belt, comprising: a winder frame, a reel and a torsion bar. wherein the winder frame comprises two opposite sidewalls, the corresponding positions of the two sidewalls having circular openings provided, the circular openings having internal toothed segments; the reel comprising a spindle through hole provided along the central axis of the spindle, two detachable end covers provided respectively on the two ends of the spindle, the end covers having external teeth provided along the periphery of the end covers; the torsion bar is divided into two segments in axial direction which are connected to each other by adjoining ends; in a free state, the reel is able to rotate and float provided within the winder frame, two end covers being provided in the circular through opening on the two sidewalls of the winder frame.

4 Claims, 14 Drawing Sheets

(30) Foreign Application Priority Data

| Aug. 27, 2012 | (CN) | .......................... 2012 1 0309066 |
| Aug. 27, 2012 | (CN) | .......................... 2012 1 0309320 |
| Nov. 29, 2012 | (CN) | .......................... 2012 1 0496376 |
| Jan. 29, 2013 | (CN) | .......................... 2013 1 0032779 |

(56) References Cited

U.S. PATENT DOCUMENTS

| 5,967,441 | A | * | 10/1999 | Kohlndorfer ....... B60R 22/3413 |
| | | | | 242/379.1 |
| 6,012,667 | A | | 1/2000 | Clancy, III et al. |
| 7,669,794 | B2 | * | 3/2010 | Boelstler ............. B60R 22/3413 |
| | | | | 242/379.1 |
| 2008/0061180 | A1 | * | 3/2008 | Webber ............... B60R 22/3413 |
| | | | | 242/379.1 |
| 2011/0147509 | A1 | * | 6/2011 | Wang ................. B60R 22/3413 |
| | | | | 242/374 |
| 2012/0043407 | A1 | * | 2/2012 | Ogawa ................ B60R 22/4628 |
| | | | | 242/379.1 |

FOREIGN PATENT DOCUMENTS

| EP | 1607288 B1 | 12/2005 |
| WO | WO2005120911 A1 | 12/2005 |

\* cited by examiner

WINDER, A TORSION BAR, A REEL, END COVERS AND A SAFETY BELT ASSEMBLY USED FOR A FORCE LIMITING SAFETY BELT

The present invention is a national phase application of PCT Application NO. PCT/CN2013/082175, which in turn claims priorities from the following Chinese Patent Application of the applicant:

1. A winder used for a safety belt and a safety belt assembly, filed on Aug. 27, 2012, whose patent application no. is 201210309066.X;
2. A torsion bar used for a safety belt winder, a safety belt winder and a safety belt assembly, filed on Aug. 27, 2012, whose patent application no. is 201210309026.5;
3. A torsion bar used for a safety belt winder, a safety belt winder and a safety belt assembly, filed on Aug. 27, 2012, whose patent application no. is 201210308979.X;
4. A reel, an end cover, a safety belt winder and a safety belt assembly, filed on Aug. 27, 2012, whose patent application no. is 201210309320.6;
5. A torsion bar used for a safety belt winder, a safety belt winder, and a safety belt assembly, filed on Nov. 29, 2012, whose patent application no. is 201210496376.7;
6. A winder, an end cover, a circular tooth ring and a safety belt assembly used for safety belts respectively, filed on Jan. 29, 2013, whose patent application no. is 201310032779.0;

TECHNICAL FIELD

The present invention relates to a technical field of a force limiting safety belt, and more particularly to a winder used for a force limiting safety belt.

Incidentally, the present invention relates to a safety belt assembly which uses the winder, and a torsion bar, a reel, and end covers used for the above winder.

BACKGROUND ART

A force-limited seat belt can limit the force which the fabric belt applies on a human body by certain force-limiting structures when a vehicle crash happens.

In the second embodiment of the European Patent whose document no. is EP1607288B1, a seat belt apparatus comprises a U-shaped frame, a reel and a torsion bar which is in the form of a rod or rods and is provided in the reel.

An important feature of the above patent lies in that when the reel is in a locked state, two ends of the reel are locked by the external teeth being engaged with the internal teeth in the U-shaped frame, the torsion bar is fixed inside the spindle and with two end covers, the torsional deflection distributes uniformly on the whole torsion bar, thus producing the force-limiting effect.

By referring to the above European patent literature, the specific details of force limiting installation apparatus in the above patent literature can be obtained.

However, with respect to the force-limiting installation apparatus disclosed in the above patent literature, the torsion bar extends outside of the end cover, the mechanical characteristics are complex, which is adverse to the sustainable property of the distortion of the torsion bar; incidentally, the property of two-level increasing force-limiting and two-level decreasing force-limiting cannot be achieved.

SUMMARY OF THE INVENTION

The present invention provides a winder used for a safety belt, which can obtain the property of one-level or two-level increasing force-limiting or decreasing force-limiting, this property being beneficial to improving the protective safety effect of a safety belt which has used this winder.

Incidentally, the present invention provides a safety belt assembly which has used the safety belt winder, and the safety belt assembly has all beneficial effects brought by the winder.

The present invention further provides a torsion bar used for a safety belt winder.

The present invention further provides end covers used for a safety belt winder.

The present invention provides a winder used for a safety belt, comprising a winder frame, a reel and a torsion bar; wherein, the winder frame comprises of two opposite sidewalls, circular openings with internal toothed segments being provided on a corresponding position in the two sidewalls, the toothed segments being provided at a position where a fabric belt is extracted outward. The reel comprises a spindle, two detachable end covers and a torsion bar, the spindle having a slot along its central axis, the spindle also being used for winding the fabric belt, the two end covers being attached on the ends of the spindle; the external teeth which engage with the teeth in the frame are provided along the periphery of the end covers; the said torsion bar which is in form of rid is provided in the said through hole of the spindle along the axis of the reel, two ends of which are able to extend to the two end covers of the spindle, middle portion of which in axile direction is provided with external teeth, and the internal teeth which are engaged with the external teeth are provided in the through hole of the said spindle; by means of the said internal teeth being engaged with the external teeth, the torsion bar is connected with the spindle; the torsion bar is also connected with the two detachable end covers by means of setting of the gears at the crossing position of the torsion bar and the said two end covers, and the corresponding gears at the end covers, the torsion bar is divided into two segments in axial direction they are connected to each other by adjoining ends, both ends of each bar segment have external teeth provided thereon, tooth profiles of the external teeth on the adjoining portion of the two bar segments align with each other and are assembled inside the spindle connecting with the internal teeth of the spindle through hole.

In a fully assembled state, the reel can be rotate and float within the winder frame, the two end covers being inside the openings of the two sidewalls of the winder frame; in a locked state, the external teeth of the two end covers of the winder engage with the teeth of the frame.

Preferably, the torsion bar is engaged with one end cover by connecting the external tooth profile of the bar with an internal tooth profile on the end cover, this end cover being called the first end cover; the side of the other end cover which faces the spindle has a circular boss provided thereon, the circular boss having internal threads, a separate ring having an internal tooth profile and external threads, connects the torsion bar to the end cover, the torsion bars external teeth profile fitting inside the ring and the outside threads of the ring screwing into the threaded boss on the end cover, this end cover being called the second end cover.

Preferably, the diameters and materials of the two segments of the torsion bar are different.

Preferably, the axial effective lengths of the two bar segments at two sides of peripheral external teeth in the middle portion of the torsion bar are different; wherein, the effective length refers to axial length of the torsion bar or the bar segment excluding the axial length of the external teeth on two ends.

Preferably, at least two shear pins are provided on both sides of the spindle; the shear pins are fixed on the end face of the spindle, and inserted into the corresponding pin orifice on the end cover; or the shear pin is fixed on the end cover, and inserted into the corresponding pin orifice on the end face of the spindle, the positions of the two shear pins of the spindle are different, preventing the left and right end covers from being incorrectly assembled, and guaranteeing that the external teeth of the two end covers have staggered and fixed angle after being installed.

The present invention provides a safety belt assembly, which has used a winder made by means of any above technical art.

The present invention provides a torsion bar used for a safety belt assembly, wherein, the torsion bar is divided into two segments in axial direction which are connected to each other by adjoining ends, wherein, the external teeth are provided on the two ends of the two bar segments, and the tooth profiles of external teeth on the adjoining portion of the two bar segments aligning with each other; peripheral external teeth on adjoining portion of the two bar segments form the external teeth provided on the middle portion of the torsion bar, which are engaged with the internal teeth provided in the slot of the spindle.

Preferably, axial effective lengths of the two bar segments at two sides of peripheral external teeth in the middle portion of the torsion bar are different; wherein, the effective length refers to axial length of the torsion bar or bar segment excluding the axial length of the external teeth on two ends.

The present invention provides end covers used for the winder made by means of any of the above technical art, wherein the end cover is a flat cylinder shape, along the periphery of which external teeth engage with internal teeth in the sidewalls of the winder frame are provided thereon; the end cover also comprises a circular toothed ring which has an external screw thread along its periphery and internal teeth in an internal opening; a center of the side of the end cover which faces the spindle also has a screw thread hole provided thereon, the screw thread hole matching with the peripheral screw thread on the circular toothed ring; the circular toothed ring and the end cover are assembled as an assembly by means of coupling the internal and external screw threads.

The length of the torsion bar in the present invention is much shorter than that in the background art, and the torsion bar does not extend outside of the end cover, making the torsion bar less resilient to bending and distorting, and is not influenced by any other members except the two end covers, thus simplifying the force state of the torsion bar, and the using process being more safe and sustainable; incidentally, in the technical art of the present invention, the torsion bar of the winder is divided into two segments; using a combination of two segments with same diameter or different diameters can produce multiple torsional values, thus forming a winder with multiple force-limiting values, and satisfying different requirements in seat belt force-limiting values of different automobile manufacturers; incidentally, each torsion bar of different diameter needs to be made by one individual mold which is very expensive, and the torsion bar is made from special materials and by means of a cold forming process whose manufacturing device is very expensive; adapting the torsion bar which has two bar segments can obtain multiple force-limiting values required by a combination of the torsion bar segments which are manufactured using less manufacturing molds, thus reducing the number of the molds and saving manufacturing costs.

In an alternative preferred embodiment of the present invention, comparing to the technique in the background art, the inner side of one end cover has a boss provided thereon, the boss being able to be inserted into a corresponding spigot on the spindle, and this structure in the present invention can support traction from the fabric belt and transmit it to the frame, and thus avoid the torsion bar bending and deforming because of the traction from the fabric belt; the positioning of the bosses on the two end covers of the safety belt winder and the spigots in the two ends of the spindle transmit the traction from the fabric belt to the frame, guaranteeing that the torsion bar just supports the torsional moment from the spindle and the reaction torque from the end cover, so the force condition is simplified and controllable, thus obtaining more consistent effect of force-limiting, being more safe and sustainable in the using process.

In an alternative preferred embodiment, the axial effective lengths of the two bar segments at two sides of the peripheral external teeth in the middle portion of the torsion bar are different; when the torsion bar is used for a safety belt, the bar segment whose effective length is shorter breaks and loses effect first because of larger distortion, this process making the force-limiting value shows obvious change; the torsion bar resists the traction from the fabric belt with its whole effective length before the fracture failure happens, and thus the force-limiting value is relatively higher, achieving the first level limited force with higher second level limited-force; after the fracture failure happens, the spindle continues rotating driven by the fabric belt till the bar segment with higher effective length fractures as it reaches a predetermined amount of turns at which the bar segment will fracture, this obtaining the second level force limiting of lower force-limiting; in this stage, only the bar segment which has not fractured supports the traction from fabric belt as the bar with higher effective length has already broken, and thus, the force limiting in this stage is less; in the above process, the seatbelt obtains the effect of increasing force limiting during a crash, protecting the safety belt users more efficiently.

In an alternative preferred embodiment of the present invention, one end of the torsion bar of the winder used for a seat belt is engaged with the first end cover by a wheel gear, and another end is screwed with the second end cover by a screw thread, but not being tightened and retaining predetermined rounds of pitch; adapting of this structure can achieve increasing force limiting effect whose specific process of implementation is as follows: with respect to a safety belt which has used the winder, when a collision happens, the fabric belt drives the spindle rotating, and the middle portion of the torsion bar supports the traction from the fabric belt by means of peripheral external teeth of the middle portion of the torsion bar being engaged with the internal teeth of the spindle, making the torsion bar rotate; when the spindle is tensioned, the two end covers of the spindle are locked on the frame, wherein, one end of the torsion bar which is engaged with the first end cover cannot rotate because of being fixed, and the second end which is screwed with the second end cover can rotate because of the predetermined thread rounds retained; namely, when the traction from the fabric belt reaches the first force-limiting value, the end engaged with the first end cover holds still, and the end which screws with the second end cover and the whole torsion bar both can obtain certain rotation, this making the first bar segment distort and deflect, further making the spindle obtain certain angles of rotation, and thus releasing partial fabric belt, achieving the first force-limiting by means of the fabric belt being released properly because of the distortion and deflection property of the torsion bar; as the spindle continues being driven by the fabric belt, the torsion bar is tightened with the thread on the second end cover, making the ends of the torsion bar stop rotating; when the traction form the fabric belt reaches the second force limiting value, the second bar segment starts being forced which means that the first bar segment and the second bar segment bear force simultaneously and both rotate, further releasing part of the fabric belt, thus achieving the secondary force-limiting; as the force-limiting value of the first limited force is determined by the first bar segment, and the force-limiting value of the secondary limited force is determined simultaneously by the first bar segment and the second bar segment, so the secondary force-limiting value is larger than the first level force-limiting value, thus realizing increasing force limiting.

The seatbelt for the above winder which is proposed in the present invention can obtain the beneficial effects brought by the above winder.

DESCRIPTIONS OF THE DRAWINGS

Figure 5:
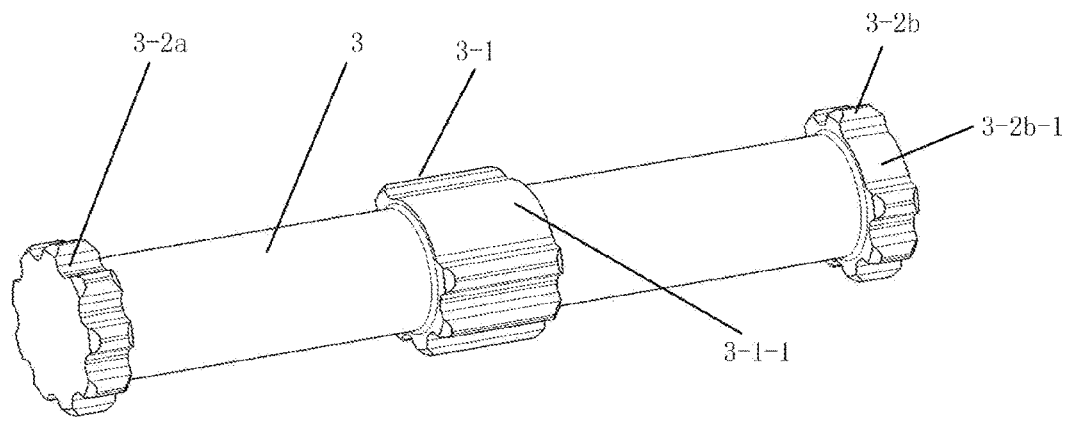
FIG. 5 is the schematic view of the torsion bar for the winder in the first embodiment.
Figure 8:
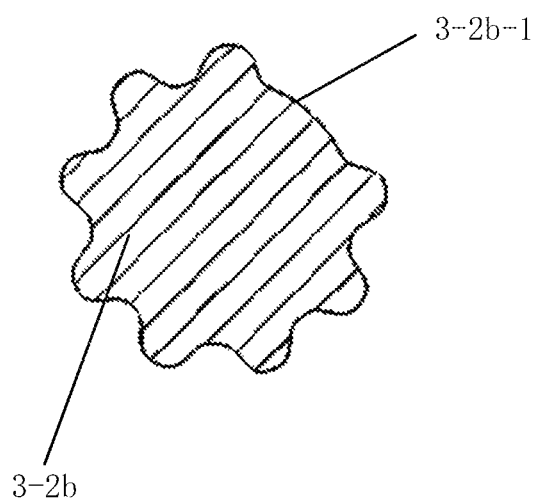
Figure 9:
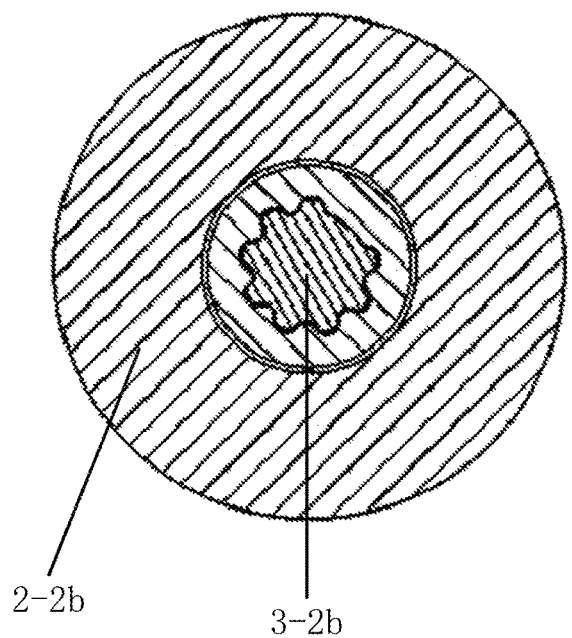
Figure 10:
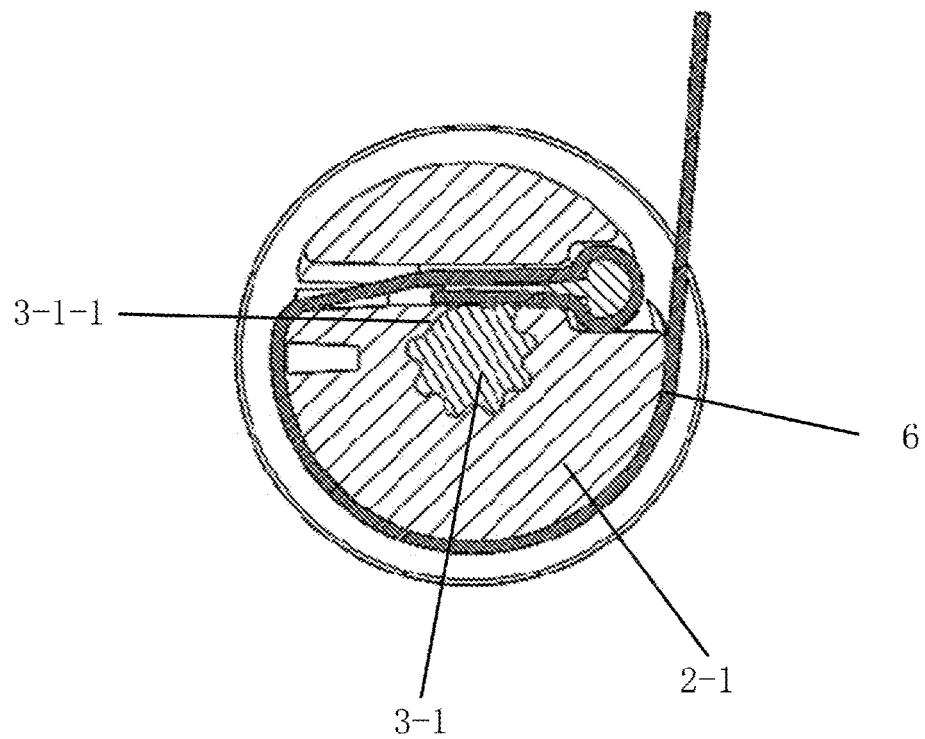
Figure 11:
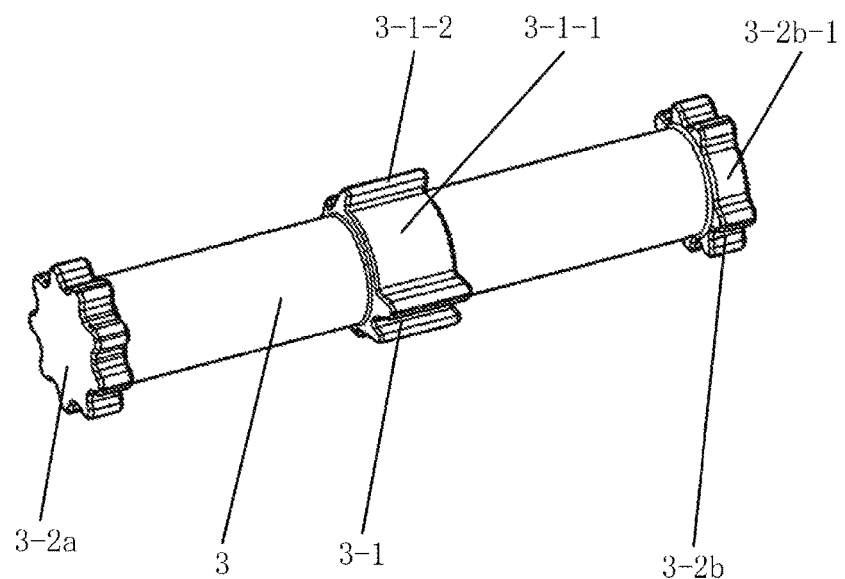
Figure 12:
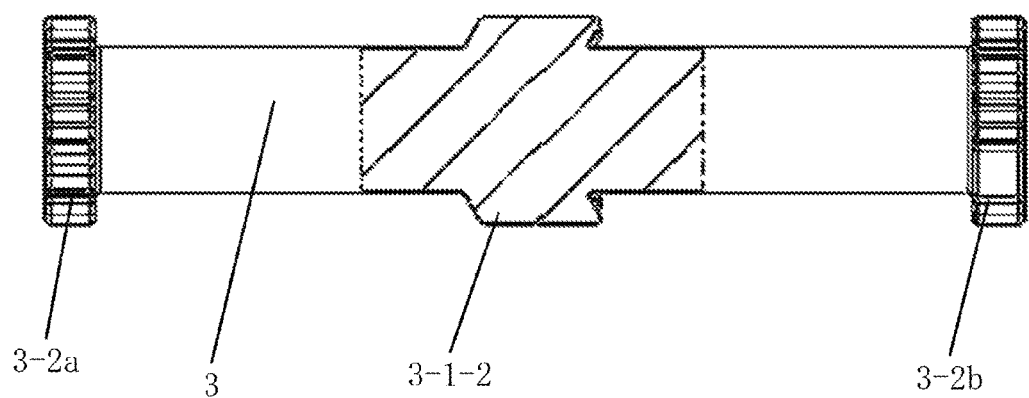
Figure 13:
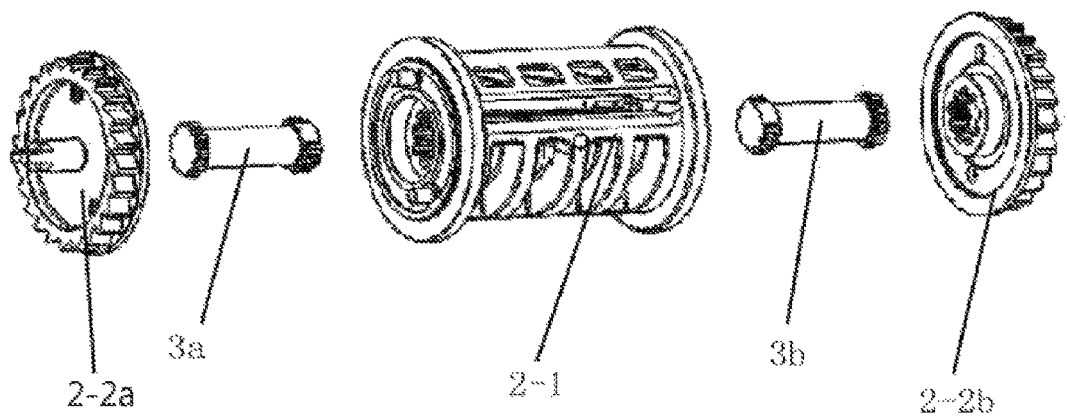
Figure 14:
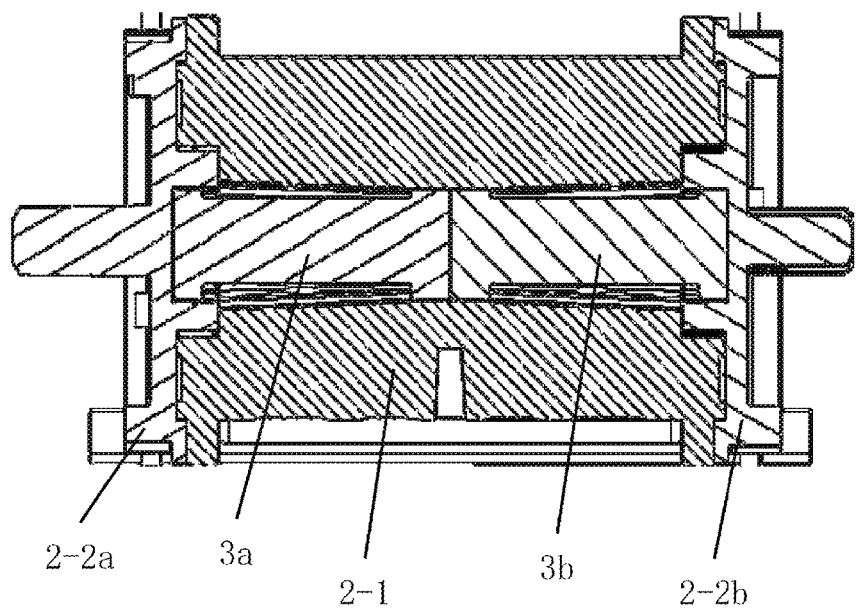
Figure 15:
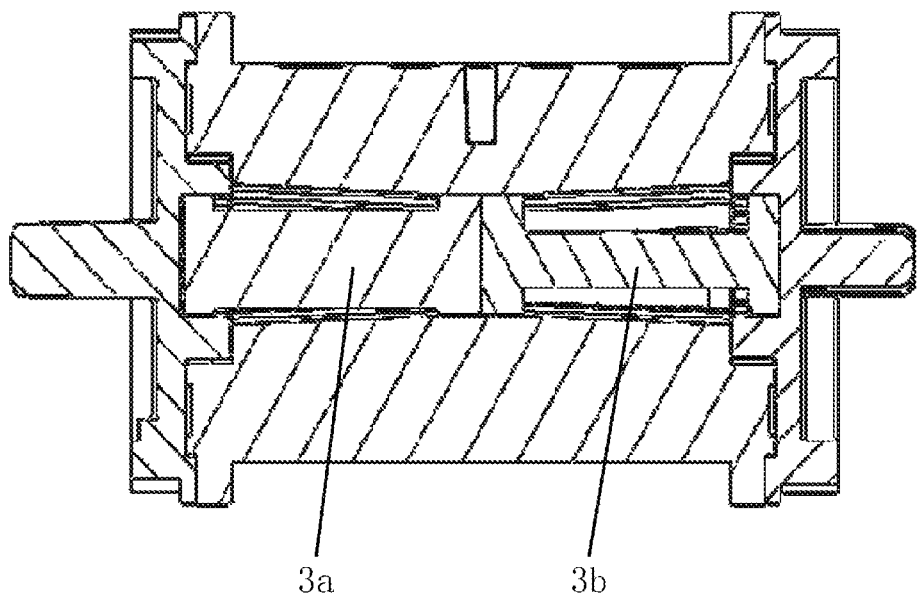
Figure 16:
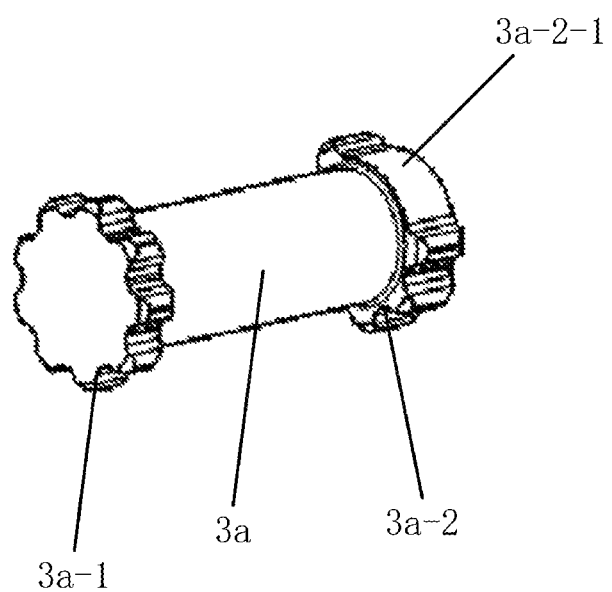
Figure 17:
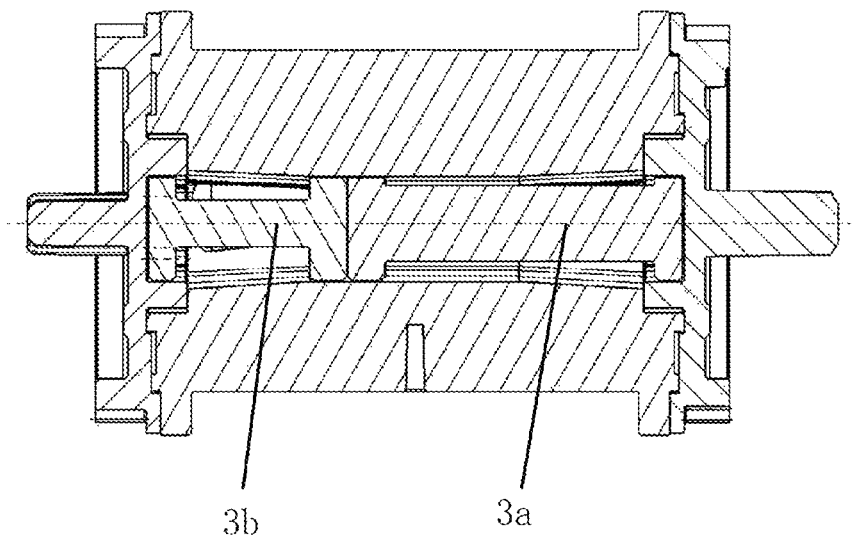
Figure 18:
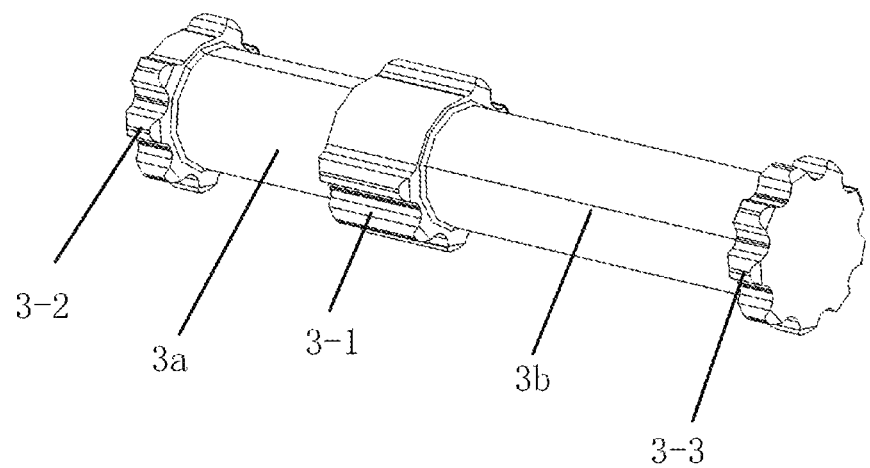
Figure 19:
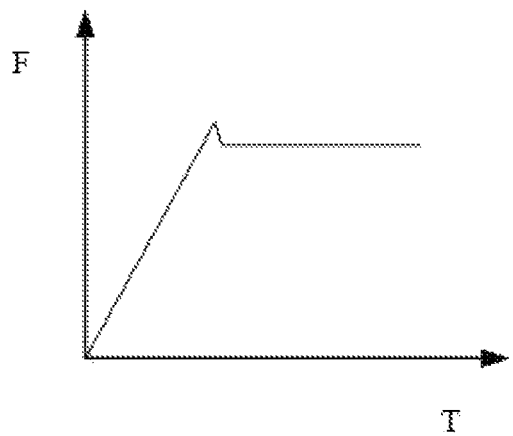
Figure 20:
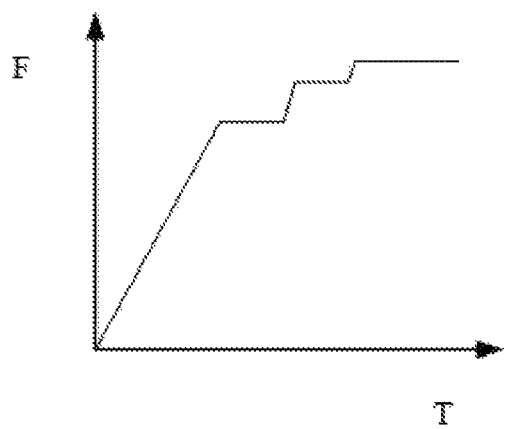
Figure 21:
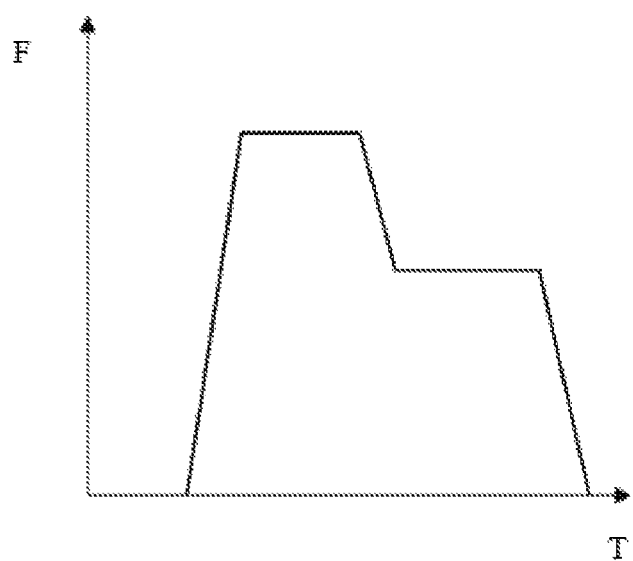
Figure 22:
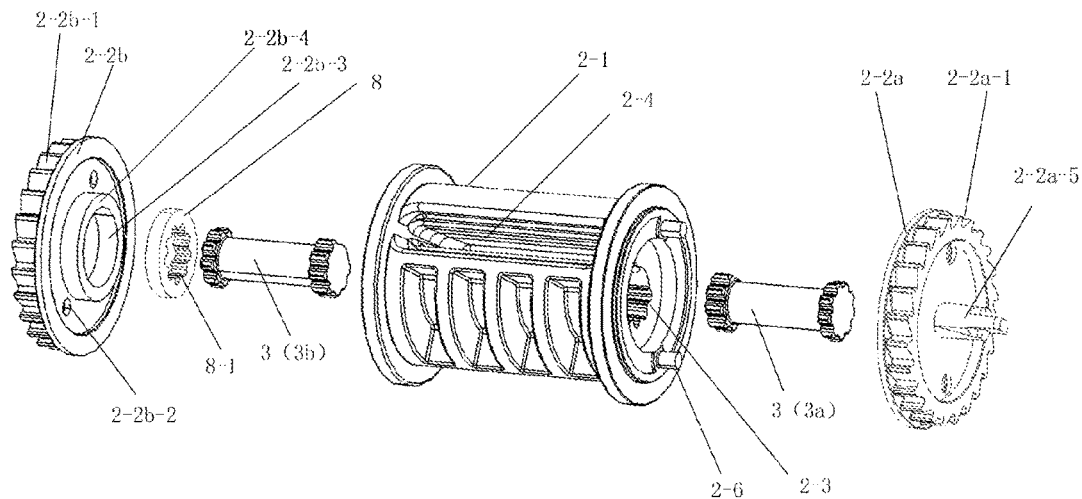
Figure 23:
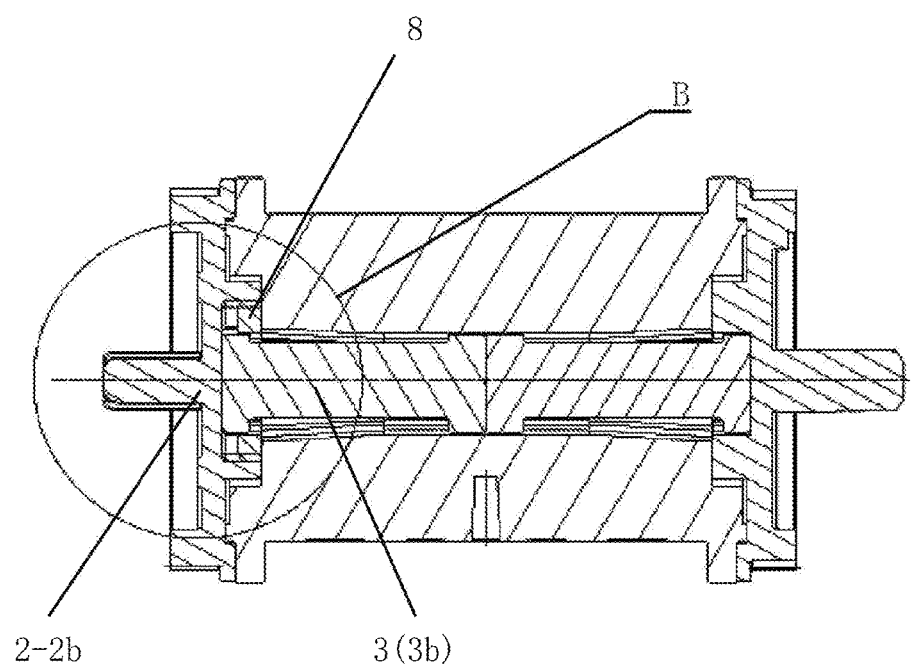
Figure 24:
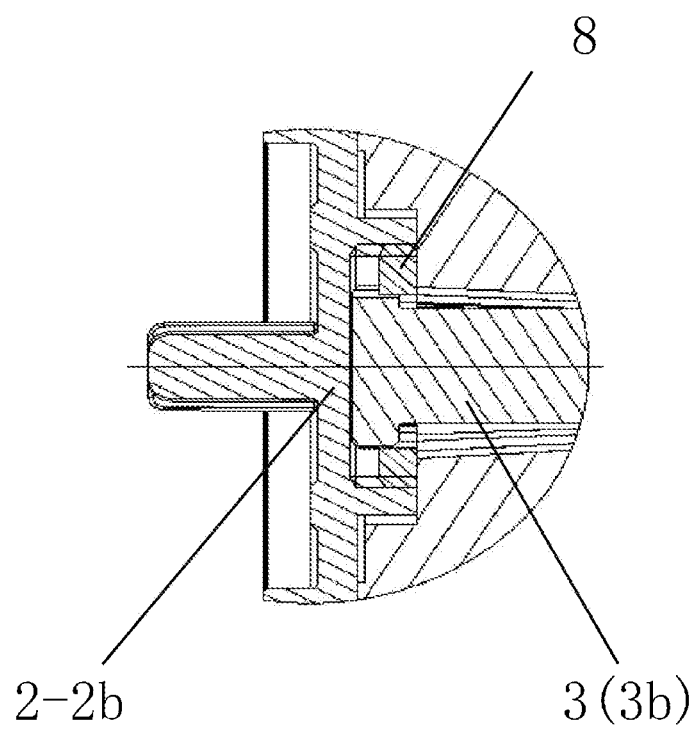

FIG. 8 the tooth profile of right end of the torsion bar in FIG. 5;

FIG. 9 is a sectional diagram of the right end of the torsion bar inserted into the right end cover;

FIG. 10 is a sectional diagram of the external teeth coupling with the through opening when the torsion bar with missing tooth in the middle portion is inserted into the spindle;

FIG. 11 and FIG. 12 respectively show the exploded view and cutaway view of the torsion bar;

FIG. 13 is exploded view of the reel members in the second embodiment;

FIG. 14 is diagrammatic cross-section of the two bar segments assembled with other members of the reel as a whole when the diameter of the two bar segments are the same in the second embodiment;

FIG. 15 is diagrammatic cross-section of the two bar segments being assembled with other members of reel as a whole when the diameter of the two bar segments are different in the second embodiment;

FIG. 16 is structure schematic view of one of the bar segment of the torsion bar in the third embodiment;

FIG. 17 is cutaway view of the two segments of the torsion bar assembled with other members of reel as a whole in the third embodiment;

FIG. 18 is structure schematic view of the torsion bar in the fourth embodiment;

FIG. 19 is the property curve of the force limiting value and time in the constant force limiting safety device;

FIG. 20 is the property curve of the force limiting value and time in the increasing force limiting safety device;

FIG. 21 the property curve of the force limiting value and time in the decreasing force limiting safety device;

FIG. 22 is the exploded view of the reel and members with the torsion bar in the fifth embodiment;

FIG. 23 is the cutaway view of the reel in axial direction in the fifth embodiment;

FIG. 24 is the partially enlarged view of the FIG. 23.

DETAILED DESCRIPTIONS

The First Embodiment

Figure 1:
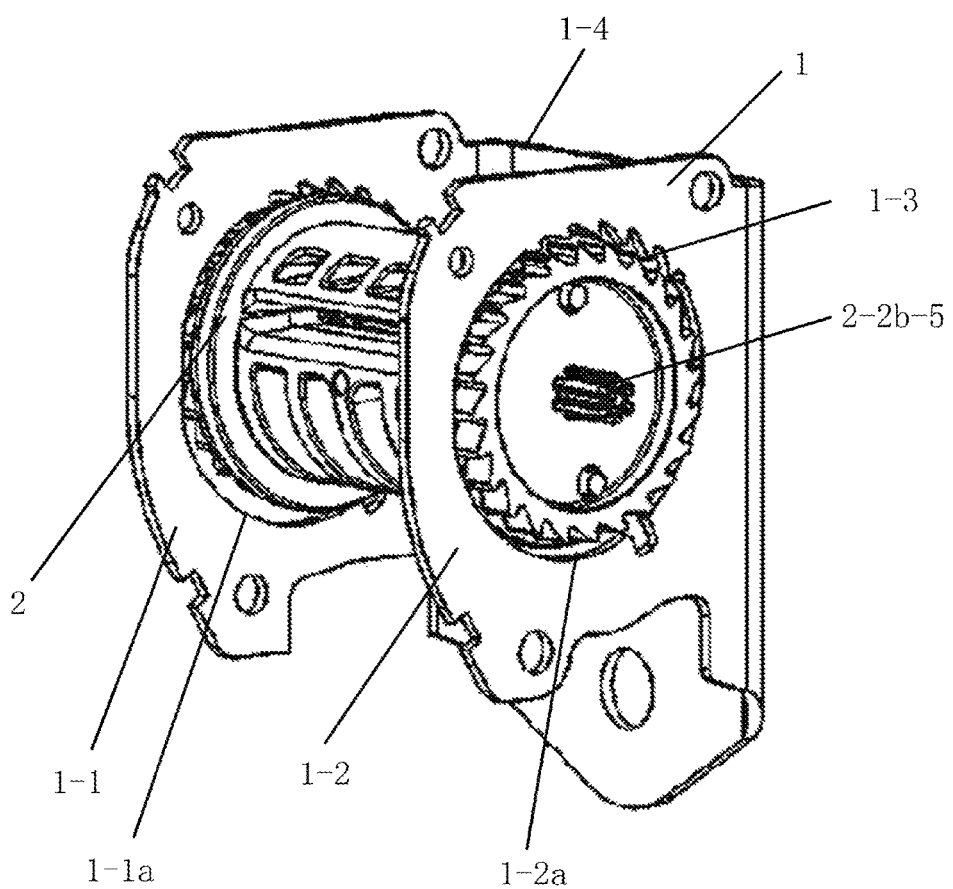
FIG. 1 is the structure schematic view of the first embodiment for the winder used for safety belt.
Figure 2:
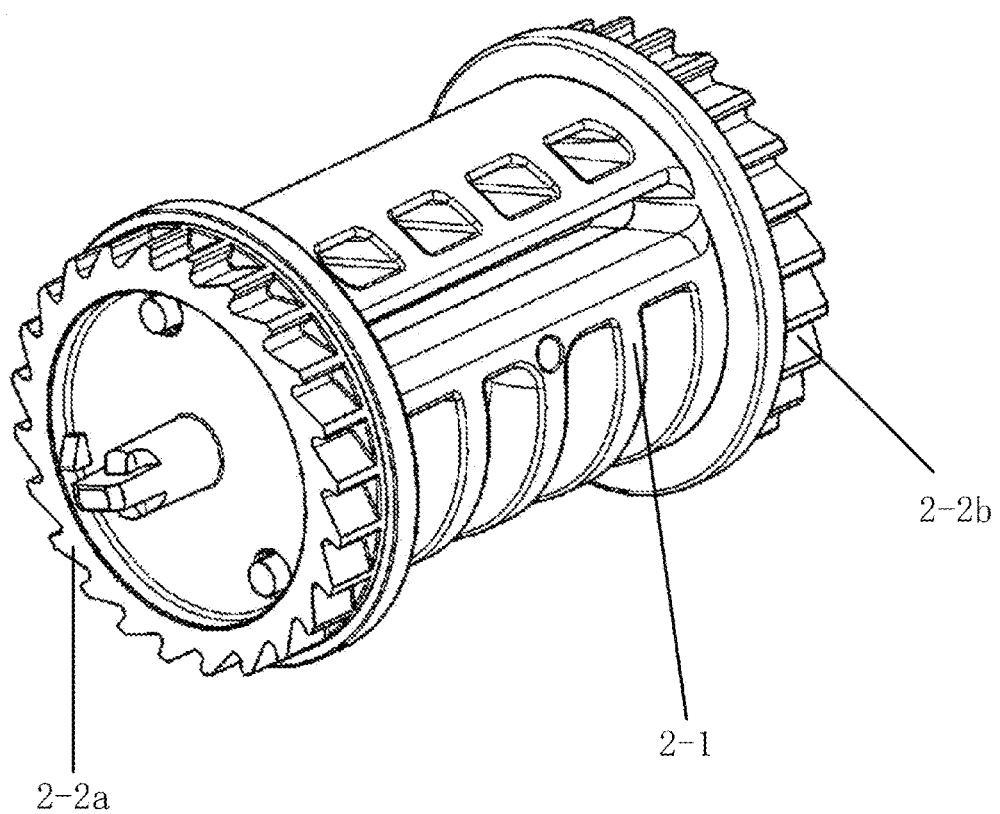
FIG. 2 is the structure schematic view for the reel in the FIG. 1.
Figure 3:
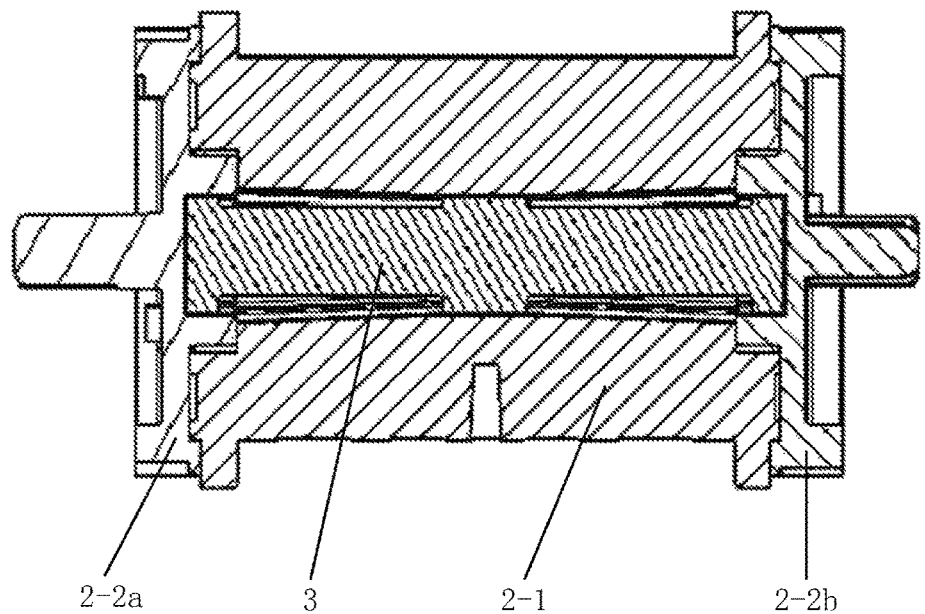
FIG. 3 is the cutaway view of FIG. 2 in axial direction of the reel.

FIG. 1 is the structure schematic view of the first embodiment for the winder used for a safety belt;

FIG. 2 is the structure schematic view for the reel in the FIG. 1;

FIG. 3 is the cutaway view of FIG. 2 in axial direction of the reel

Figure 4:
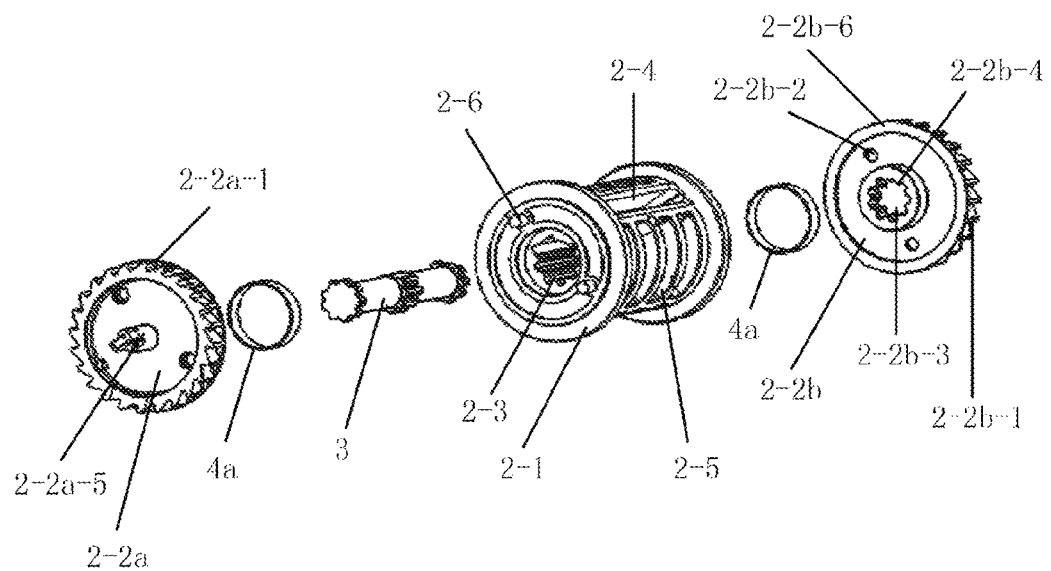
FIG. 4 is the exploded view of the reel members.

FIG. 4 is the exploded view of the reel members.

In the present embodiment, please refer to FIG. 1, and the winder comprises a winder frame 1, a reel 2 (shown in FIG. 4).

Wherein, the winder frame 1 shows U-shaped, comprising two opposite sidewalls: the first sidewall 1-1 and the second sidewall 1-2, further comprises the third sidewall 1-4 connecting the first sidewall and the second sidewall. The first sidewall 1-1 and the second sidewall 1-2 respectively have the first round opening 1-1a and the second round opening 1-2a provided on corresponding positions, the two openings having toothed segments provided at the same positions (FIG. 1 just shows situation of toothed segment provided in the second opening). The toothed segment 1-3 is used for locking the reel by means of coupling with the frame teeth, so the teeth segment 1-3 is provided at a corresponding position where the fabric belt wound on the reel is driven outwardly.

In the frame showed in the FIG. 1, the fabric belt is pulled outwardly from the inner side and the upper portion of the third sidewall 1-4, so the toothed segment is provided on the top portion of the two openings. The locking position is positioned to ensure locking is always in the same position and in the direction of force when the safety belt is in use. Providing such a controlled locking position has the advantage of overcoming flexible locking of the winder in the background art.

Furthermore, the external teeth on the reel are starter teeth towards reel rotating direction, and the teeth on the winder frame 1 has starter teeth whose tooth direction is opposite to that on the reel 2, which guide the reel 2 on both sides to lock correctly during the locking process.

Please refer to FIG. 2, FIG. 3 and FIG. 4, and the reel 2 comprising the spindle 2-1 and the detachable end covers provided on two ends of the spindle 2-1: the left side end cover 2-2a and the right side end cover 2-2b. The spindle 2-1 is used for winding the fabric belt of the seatbelt. The fabric belt can freely wind in and out around the circumference of the spindle during normal use. The spindle has a slot 2-3 provided along its axis, the slot has internal teeth used for fitment of the torsion bar/bars, in the inner wall, the slot also allows for the fixation of the fabric belt 2-4 (seeing FIG. 10).

The two end faces of the spindle 2-1 respectively have shear pins provided thereon, the shear pins extend outwardly from the spindle face.

As showed in FIG. 4, the two end covers have external teeth provided on their peripheries: external teeth 2-2a-1 provided on the periphery of left side end cover 2-2a, external teeth 2-2b-1 provided on the periphery of right side end cover 2-2*b*, and the teeth on the two said end covers engage with the frame teeth when the safety belt locking process takes place.

The faces of the two end covers which face the spindle 2-1 have pin orifices provided at positions where they correspond to the positions of the shear pins on the spindle 2-1, such as pin orifice 2-2*b*-2 in the right end cover 2-2*b* showed in FIG. 4. Shear pins are inserted into corresponding pin orifices when the two end covers are assembled to the spindle 2-1 as shown in FIG. 2. Furthermore, the shear pins can also be arranged at the internal side of the end cover, while the pin opening could be provided at a corresponding position of the end face of the spindle 2-1. Positions of the shear pins at two ends of the spindle can be different, which could be used to fix the position when the end cover and spindle 2-1 are assembled, preventing left and right end covers from being wrongly assembled.

More important, the shear pins 2-6 can also bear a force from the rotating of the spindle, and be cut off when the shear force reaches a threshold value.

The center end faces of the two end covers which face the spindle 2-1 further have center concave orifices (hereinafter referred to as the concave orifice) provided thereon, such as concave orifice 2-2*b*-3/4 on right end cover 2-2*b* showed in FIG. 4. In the embodiment, concave orifices of the two end covers are provided on the bosses which extend outside of the end covers; Accordingly, spigots used for containing the bosses on end faces of the spindle are provided on their end faces.

External sides of the two end covers (side of the end cover which is far away from spindle 2-1), have projecting shafts provided along the center of the end cover, the shafts extending outwardly, such as the right projecting shaft 2-2*b*-5 in FIG. 1, and the left projecting shaft 2-2*a*-5 in FIG. 4. Wherein, the left projecting shaft 2-2*a*05 connects with the mechanism side of the safety belt, and the right projecting shaft 2-2*b*-5 connects with a coil spring.

In the embodiment, the winder further comprises a torsion bar 3 showed in FIG. 4 which shows a rod-shaped bar, the torsion bar having external teeth provided in the middle and on it's two ends.

The structure of the torsion bar 3 and the spindle 2 are shown in FIG. 2, FIG. 3, and FIG. 4; the torsion bar 3 is inserted into the slot 2-3 of the spindle 2-1, with external teeth in axial direction the middle portion engaged with internal teeth provided in the internal wall of the slot 2-3 of the spindle. The left side end cover 2-2*a* and the right side end cover 2-2*b* cover two end portions of the spindle 2-1 respectively from the left and the right sides, and the corresponding shear pins correspond to the pin orifices. Two ends of the torsion bar 3 fit into the corresponding teeth provided on the left and right side end covers 2-2*a* and 2-2*b* respectfully. (see FIGS. 13, 14 & 15)

In the present embodiment, as showed in FIG. 4, the bearing ring 4*a* is further provided between the bosses of the two end covers and the spigot of the spindle 2-1; the bearing ring 4*b* is made from a low friction plastic, the bearings prevent a metal to metal rubbing which could cause a gluing/sticking effect between the spigot and the end cap covers during rotation.

As shown in FIG. 4, the end cover is provided along outboard edge thereof with a circular boss (FIG. 4 shows a circular boss 2-2*b*-6 on the right end cover). The spindle 2-1 is provided on the corresponding position of the facing ends thereof with an avoidance spigot which matches the circular boss. By means of provision of a structure of the circular boss and the avoiding spigot, the friction area between the facing end of the spindle 2-1 and the end cover during rotation is reduced and thereby decreases the friction force between the spindle and the end cover so as to increase the stability of the force-limiting effect.

The reel 2 is assembled inside the frame 1 through the frame side wall openings.

In a fully assembled state, the reel 2 can rotate and float in the winder frame 1, wherein the external teeth on the end covers do not touch the internal teeth in the opening of the winder frame 1. The reel 2 is supported by a projecting shaft provided on the outer sides of the two end covers, and the reel 2 can rotate freely, when winding and releasing the fabric belt. While in a locked state, the external teeth on the two end covers of the reel 2 are engaged with the teeth at a corresponding position of the frame 1, preventing the reel 2 from rotating.

Furthermore, in the above embodiment of the present invention, the opening in the frame has a toothed area 1-3, which corresponds to the direction of travel of the webbing when being extracted. When compared to a frame with a toothed section completely around the frame, this section 1-3 guarantees the reel is always locked in a fixed and controlled position.

In the winder of the present invention, two end covers of the reel have two ends of the torsion bar 3 fitted, the two ends do not extend outside of the end covers, namely the length of the torsion bar in axis direction is not longer than the length of the reel in axial direction. Comparing to the torsion bar in the background art, the torsion bar in the present invention is shortened, and the shortened portion is replaced by the projecting shaft provided on the outer side of the end cover. When a collision occurs, driven by the fabric belt, the spindle rotates, further driving the torsion bar to rotate. As the two end covers are locked in the frame and they are engaged with the two ends of the torsion bar simultaneously, the two ends of the torsion bar are unable to rotate. The torsion bar 3 supports the traction from the webbing belt by means of peripheral external teeth in the middle portion being engaged with internal teeth of the spindle 2-1, while the two ends are fixed because of the meshing relationship between the external teeth on the torsion bar ends meshed with the teeth in the inner face of the end cover 2-2; when the traction from fabric belt reaches to certain value, the torsion bar 3 distorts and deflects, making the spindle 2-1 rotate at a certain angle, thus releasing partial fabric belt; this property of distorting and deflecting of the torsion bar 3 can release the fabric belt properly, making the force of the fabric belt on the human body controlled at a predetermined value, avoiding injury to the human body by avoiding large forces; meanwhile, the fabric belt will not be released overlong, which makes the fabric lose effect of binding human body. The length of the torsion bar is shortened so that the torsion bar is not easy to distort and deflect, and not be restrained by other members except the end covers at two sides; the whole force condition of the torsion bar is simplified, and the using process is more safe and sustainable; incidentally, the torsion bar is not easy to distort and deflect so that relative angle between the spindle and the end cover is kept, thus not causing partial metal fraction and agglutination between the spindle and the end cover.

Furthermore, in the present embodiment, because of the shortened length of the torsion bar, and the position of the boss in the internal side of the end cover and the spigot in the spindle, the torsion bar just supports the force from the spindle and counter-acting force from the end cover, and does not support the traction from the webbing directly, so the force condition of the torsion bar is easier to control, making it possible to design force limiting pins which meet the required force limits.

Furthermore, the design of the central segment of the torsion bar makes the distribution of the force equal on both sides of the bar, allowing for a smaller diameter bar to meet requirements. The material and process to manufacture a torsion bar is high, so a shorter torsion bar has the added advantage of cost savings.

Second, in the present invention, the force limiting pins 2-6 provided on the two ends of the spindle of the reel 2 described as above; when the reel 2 is in a locked state, driven by the safety belt webbing, the spindle 2-1 tends to rotate with the two end covers, then the force limiting pin 2-6 and the external teeth 3-1 in middle portion of the torsion bar will prevent it from rotating. The force limiting pin 2-6 is subject to a shear force from the end cover and the spindle 2-1. When a collision happens, there is a loading procedure of traction from the fabric belt rapidly producing a high load. During this procedure, when the traction force is smaller than the threshold value of the shear pin, the torsion bar does not take any load, but when the force is higher than the shear force of the pins the pins will fracture and the torsion bar 3 takes the load completely, producing a process of distortion and deflection of the torsion bar 3.

In the present embodiment, the middle portion of external teeth of the torsion bar 3 has a missing tooth area, which is called an avoiding tooth, such as the avoiding tooth 3-1-1 shown in FIG. 11 and FIG. 5.

FIG. 10 is the collaboration diagrammatic drawing of the external teeth coupling within the spindle slot when the torsion bar with the missing tooth in the middle portion is inserted into the spindle. It can be seen from the FIG. 10 that the position and design of the avoiding tooth 3-1-1 in the torsion bar 3 allows fitment of the fabric belt. The position and design of the spindle slot ensures that the direction of the fabric belt is perpendicular to the center shaft of the spindle 2-1, and as close as possible to the center shaft.

In the embodiment of the present invention, the torsion bar 3 also has a missing tooth for preventing errors of assembly; as shown in FIG. 5, one end of the torsion bar (taking the right end for example in the present invention) has a missing tooth for preventing the error of assembling 3-2b-1, while the other end does not have a missing tooth, ensuring that the torsion bar can only be fitted in one direction through the spindle slot. Accordingly, the end cover 2-2b has a boss with the matching female profile to the missing tooth. As showed in FIG. 4, the concave hole 2-2b-3 of the end cover 2-2b has a corresponding mouth for preventing error of assembling 2-2b-4. The reason of the above settings of missing tooth for preventing error of assembling is that it 3-2b-1 can guarantee that the torsion bar 3 is inserted into the through opening 2-3 of the spindle successfully at a time, which needs to be inserted into it at proper angle because of the existence of the above avoiding tooth 3-1-1.

Figure 6:
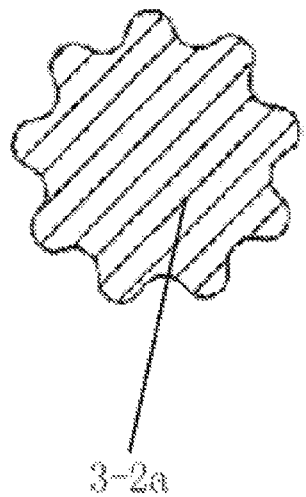
FIG. 6 is the tooth profile of left side end of the torsion bar in FIG. 5.
Figure 7:
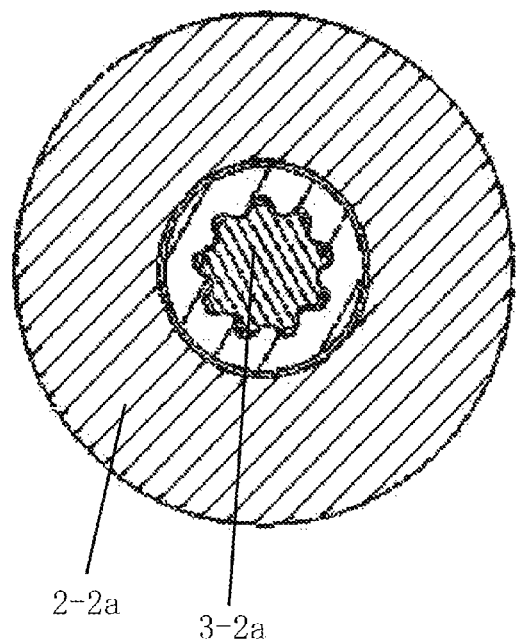
FIG. 7 is a sectional diagram of the left end of the torsion bar inserted in the left end cover.

FIG. 6 is the tooth profile of the left side end of the torsion bar in FIG. 5; FIG. 7 is the collaboration diagram of the left end of the torsion bar being inserted into the concave hole in the left end cover; FIG. 8 the tooth profile of right end of the torsion bar in FIG. 5; FIG. 9 is the collaboration diagram of the right end of the torsion bar being inserted into the concave hole in the right end cover;

Settings of the missing tooth for preventing error of assembling 3-2b-1 at the right end of the torsion bar 3 leads to difference of number of teeth between the left and right ends, further leading to difference of bearing torsion of two ends when the torsion bar 3 distorts and deflects. So, the present invention solves this problem by the method below:

External teeth 3-1 at the middle portion of the torsion bar 3 incline towards the right end 3-2b (a end has a missing tooth for preventing the error of assembling provided thereon), making the tooth surface of the peripheral external teeth wholly incline towards the end where a missing tooth for preventing error of assembly is provided thereon; we can see inclining situation from the FIG. 11 and the FIG. 12, which shows respectively the space diagram and the cut-away view of the torsion bar 3. The design of external teeth 3-1 which incline towards the right side helps balance the applied force on the torsion bar 3 from the spindle 2-1 making the whole torsion bar being evenly forced.

It is necessary to state that we take the situation of the torsion bar not extending the outside of two end covers of the spindle for example in the above embodiment, however, those skilled in this technical field should understand that the torsion bar of the winder recorded in the background art can also be used in the present invention, with a through opening provided at the corresponding center of the end covers, which will not be describe any more.

The Second Embodiment

The difference of the winder in the present embodiment from the above first embodiment is that its torsion bar has a structure of two segments, as shown in FIG. 13. The exploded view of the reel in the second embodiment;

In the present embodiment, the torsion bar comprises two bars whose axial lengths are the same: the first rod 3a and the second rod 3b, the end portion of each rod having external teeth provided in axial direction. When the two segments are installed into the torsion bar, two adjoining ends and two adjoining end faces of the two bars are connected to each other, and corresponding teeth corresponds to each other without staggered teeth; the whole external teeth on the jointing portion of the two ends are treated equivalently to the peripheral external teeth in the middle portion of the torsion bar whose function and connection type with the spindle is the same as that in the first embodiment. The other ends of the two bars are inserted into the corresponding concave holes on the inside face of the end covers, as described in the first embodiment. Furthermore, the external teeth on the jointing portion of the two bars have the same avoiding teeth as described in the first embodiment.

Other members except the torsion bar in the present embodiment are the same as those in the above first embodiment.

The division of the torsion bar into two segments has the following effects: the combination of two bar segments of the same diameter or different diameters can generate multiple force-limiting values, thus forming a winder with multiple force-limiting values by using less torsion bars, and satisfying different requirements of force-limiting values of the safety belt from different car manufacturers, FIG. 14 shows two torsion bars of the same diameter and FIG. 15 shows two torsion bars of different diameters.

Furthermore, different effects of force-limiting values can also be obtained by using a torsion bar with the same or different materials.

Incidentally, each torsion bar of different diameters needs to be made by one individual mold which is very expensive, and the torsion bar is made from special materials and by means of a cold forming process, whose manufacturing device is very expensive; adapting a torsion bar with two segments can obtain multiple force limiting values required by combination of the torsion bar manufactured by less manufacturing molds, thus reducing the number of the moulds and saving in manufacturing costs. In addition, the shorter torsion bar is easy to be made, with high percentage of pass, and the cost for each mold is relatively lower.

Incidentally, the change of the torsion bar material and the change of the diameter can be conducted simultaneously, making many combinations of different force-limiting values, which will not be described any more now.

The Third Embodiment

In the winder of the present embodiment, the torsion bar is divided into two segments in the same way as that in the second embodiment; FIG. 16 is the structure schematic view of one of the bar segment of the torsion bar in the third embodiment; FIG. 17 is the cutaway view of the two segments of the torsion bar assembled with the other members of the reel in the third embodiment;

As shown in FIG. 16 and FIG. 17, in the present embodiment, the torsion bar shows two bars divided into two segments in axial direction, two ends of each segment having peripheral external teeth provided thereon, please refer to FIG. 16, two ends of bar segment 3*a* having external teeth 3*a*-1 and 3*a*-2 provided thereon. When the two segments are installed into a torsion bar assembly, the two bar segments of the torsion bar whose ends abut against each other with end face respectively being in touch with each other and with outer teeth thereon aligning to each other not offsetting form the whole torsion bar.

What differs from the above second embodiment is that the effective lengths of two rods of the torsion bar are different; the effective length defines the axial length of the torsion bar excluding the axial length of the external teeth. As showed in FIG. 17, the first bar segment 3*a* is longer than the second segment 3*b*, which is purposely designed instead of manufacturing error. The other structures in the present embodiment are the same as those in the above second embodiment, which will not be described any more.

In the present embodiment, the axial effective lengths of the two rods at each side of the peripheral external teeth in the middle portion of the torsion bar are different; when the torsion bar is used for a safety belt during a crash, the rod whose effective length is shorter breaks and loses effect first, due to the larger distortion, followed by the 2nd rod, before the shorter rod breaks the 2 rods are working as a single torsion bar with a relatively high load, after breakage of the shorter rod the longer rod continues to rotate at a smaller load, giving a 2 stage load limiting from high to low. (see FIG. 21)

The force limited safety assembly in the first and second embodiments is constant force load limiting types, also referred to as one level or single level force limiters, whose property curves can be seen in FIG. 19.

Furthermore, the change of torsion bar material and the change of diameter can be conducted simultaneously making more combinations of load limiting, which will not be described any more now. The effective length and diameter of the two rods in FIG. 17 are different.

The other parts of the present embodiment are the same as those in the above second embodiment, which will not be described anymore.

The Fourth Embodiment

With respect to the torsion bar of the winder in the present embodiment, effective lengths of the two segments at two sides of the circumferential external teeth in the middle of the torsion bar are different, while the torsion bar in the present embodiment showed in FIG. 18 is all in one instead of segmental type in the third embodiment. The other respects of the reel in the present embodiment are the same as those in the third embodiment, which will not be described any more.

The Fifth Embodiment

In the present embodiment, the winder used for a safety belt also comprises a frame, a reel, and a torsion bar, wherein, the frame is the same as that in the first embodiment. The reel is shown in FIGS. 22, 23 and 24, wherein, FIG. 22 is the exploded view of the reel and the members of the torsion bar in the fifth embodiment; FIG. 23 is the cutaway view of the reel in axial direction in the fifth embodiment; FIG. 24 is the partially enlarged view of the FIG. 23.

Referring to FIGS. 22, 23 and 24, in the present embodiment, the reel 2 comprises a spindle 2-1 and end covers positioned detachably at both ends of the spindle 2-1: the first end cover 2-2*a* and the second end cover 2-*b*. The structure of the first end cover 2-2*a* and its assembly relationship with the spindle 2-1 are the same as those in the first and second embodiments. The center of the end face of the second end cover 2-2*b* which faces the spindle 2-1 has a threaded orifice 2-2*b*-3, the threaded orifice having an internal thread provided therein, the threaded orifice 2-2*b*-3 being a blind orifice. Particularly, in the present embodiment, the threaded orifice 2-2*b*-3 is provided on boss 2-2*b*-4 which extends from the inside of the end face, as showed in FIG. 22, accordingly, a spigot for containing the boss 2-2*b*-4 needs to be provided on the corresponding end face of the spindle 2-1.

In the present embodiment, the torsion bar 3 of the winder is divided into two segments in axial direction, which are called the first bar segment 3*a* and the second bar segment 3*b*, the two ends of the bar segments having external teeth positioned thereon. When the two bar segments are assembled, the two adjoining ends of the two bar segments connect to each other, and the two adjoining ends come face to face with each other, the external teeth on two ends correspond to each other without staggered teeth when the two bar segments are assembled as a whole torsion bar. The external teeth on the jointing portion of the two ends of the torsion bar couple with the internal teeth in the slot of the spindle 2-1, as shown in FIG. 22.

The external teeth on one of the outside ends of the torsion bar couple with the internal teeth in the on the first end cover 2-2*a* of the winder in the present embodiment, while the external teeth on the other end couple with the internal teeth in the internal opening 8-1 of the circular toothed ring 8 shown in FIG. 22. In the present embodiment, the length of the torsion bar 3 in the axial direction is not longer than the length of the reel of the winder in axial direction. What needs to be described is that the torsion bar mentioned in the present descriptions means a whole torsion bar assembled by the above two bars if there is no definite description.

In the present embodiment, the internal opening of the circular toothed ring 8 has internal teeth positioned, the internal teeth coupling with one outside end of the torsion bar; the periphery of the circular toothed ring also has an external thread positioned thereon, the external thread coupling with the internal thread on thread hole 2-2*b*-3 on the second end cover 2-2*b*.

When the device is assembled, the torsion bar 3 is inserted into the slot 2-3 of the spindle 2-1, external teeth on the middle portion in axial direction being engaged with the internal teeth positioned in the inside wall of the slot 2-3 of the spindle. The first end cover and the second end cover, cover the two ends of the spindle 2-1 respectively, and accordingly the shear pins corresponds to the pin orifice. One end of the torsion bar 3 is inserted into the spindle slot of the first end cover 2-2a, external teeth on the end being engaged with the internal teeth of corresponding boss on the end cover, while the other end is inserted into the internal orifice of the circular toothed ring 8, and engaged with the internal teeth therein. The circular toothed ring 8 screws in the thread hole 2-2b-3 on the second end cover 2-2b through its periphery thread, forming a part of the second end cover 2-2b, and the thread is not screwed wholly with the predetermined circles left (such as one to two circles). Namely, one end of the torsion bar 3 is engaged with the first end cover 2-2a by connecting the external tooth profile of the bar with an internal tooth profile on the end cover, and the other end is screwed with the second end cover 2-2b by the circular toothed ring 8.

The reel is wholly provided in the frame at the same way as that in the above first embodiment.

The working process of the winder in the present embodiment is as follows: when a collision occurs, the fabric belt drives the spindle 2-1 rotating, the peripheral external teeth on the middle portion of the torsion bar 3 are engaged with the internal teeth of the spindle, making the torsion bar support traction from the fabric belt and rotate; when the fabric belt is fastened, the two end covers of the spindle 2-1 are locked on the frame, wherein, the first end cover 2-2a is engaged with one end cover of torsion bar 3, making this end of the torsion bar fixed and unable to rotate, and the another end is screwed with the second end cover by the circular toothed ring, being able to rotate because of predetermined thread circles; that is to say, when the traction from the fabric belt reaches the first force limiting value, the end engaged with the first end cover is locked, while the end screwed with the second the end cover and the whole torsion bar can rotate moderately, thus making the first bar segment 3a distort, further making the spindle 2-1 achieve a certain angle of rotation, releasing partial fabric belt, and achieving the first level force limiting; as the fabric belt continues exerting traction over the spindle, the thread where torsion bar 3 is screwed with the second end cover 2-2b is screwed tightly, and the torsion bar stops rotating; when the fabric belt traction reaches the second force limiting value, the second bar segment starts being forced, so the first bar segment and the second bar segment are both forced at this moment and to rotate, further releasing part of the fabric belt, thus achieving the second level force limiting; as the force limiting value of the first level limited force is determined by the first bar segment 3a, and the force limiting value of the second level-force limited is determined simultaneously by the first bar segment and the second bar segment, so the second level-force limited value is larger than the first level-force limited value, thus producing increasing force limiting, as the property curve showing increasing force limiting can be seen in FIG. 20. The increasing force limiting safety apparatus is very important in situations where there are no other protective safety measures.

For example, positions where there is limited space such as passengers in the back of cars or children in child seats, a safety belt having the above increasing force-limiting safety device offers better protection, when a crash occurs, the lower force-limiting allows the occupant to move forward with lower forces on the body and the increased load-limiting slows down forward movement, reducing the risk of serious injury.

Incidentally, in the present embodiment, the torsion bar 3 is made up of 2 bars whose effective lengths can be different, the diameters and materials of the two bar segments can also be different. In addition, the use of different combinations of length, material and diameters of bars can give a large variety of loading curves, which would not be possible with a one bar solution.

In the above embodiment, the end of torsion bar 3 is screwed with the second end cover 2-2b by the circular toothed ring 8 which is engaged with the end. In an alternative embodiment of the present invention, the circular toothed ring 8 can be deleted and incorporated directly in the end cover, with external thread coupling.

Of course, this will increase the difficulty of manufacturing the torsion bar 3. Additionally, in another embodiment of the present invention, the torsion bar 3 can be a one piece bar, which will not be described any more.

Furthermore, what needs to be stated is that in the above embodiment, the torsion bar is illustrated by using a torsion bar not extending outside of the two end covers of the reel as example, however, those skilled in the art should understand that the torsion bar recorded in the background art can also be used in the present invention, so the axial length of the torsion bar is longer than the axial length of the winder. Accordingly, the end covers would need to be designed with openings through their centers, which will not be further described.

The present invention further claims a safety belt assembly which uses the winder in the above embodiment, and can obtain the beneficial effects brought by the winder in the above embodiment. By referring to the background art, the assembling of the winder with the fabric belt and the other relative elements is clear, which will not be described any more.

The above descriptions are just preferred embodiments of the present invention, and it should be pointed out that those skilled in the art, on condition of not disaffiliating the principle of the present invention, the invention can be improved and embellished, which will also be regarded as protective scope of the present invention.

What is claimed is:

1. A winder for a force limiting safety belt, comprising:
   a winder frame, a reel and a torsion bar,
   wherein the winder frame further comprises two opposite sidewalls and the two opposite sidewalls have two circular openings provided thereon, partial of the circular openings having a plurality of internal toothed segments, the internal toothed segments being provided on a corresponding position where the force limiting safety belt is driven outwardly;
   the reel comprises a spindle which uses internal toothed segments for binding the force limiting safety belt, the spindle having a slot, and two detachable end covers provided respectively at two ends of the spindle, the detachable end covers having a plurality of external teeth provided along the periphery of the detachable end covers, the external teeth of the detachable end covers being engaged with the plurality of internal teeth on the winder frame;
   the torsion bar is divided into two segments in axial direction, the two segments being connected to each other by a plurality of adjoining ends and being assembled in the slot of the spindle along the axis of the spindle, two ends of the bar segments having the external teeth provided thereon, the external teeth being engaged with internal teeth provided on the detachable end covers, a plurality of tooth profiles of the external teeth on an adjoining portion of the two bar segments aligning with each other, making a central external toothed segment, a central external toothed segment being engaged with the internal teeth provided on the internal wall of the slot of the spindle;

in a free state, the reel is configured to rotate and float in the winder frame, the two end covers of the reel being provided in the circular openings; in a locked state, the external teeth of the two detachable end covers of the winder are engaged with the internal toothed segments of the frame.

2. The winder used for a force limiting safety belt of claim 1, wherein the torsion bar is engaged with one end cover by connecting an external tooth profile of the bar with an internal tooth profile on a first end cover;

a second cover which faces the reel further comprising a circular toothed ring, the circular toothed ring having an external thread peripherally and internal teeth in the internal opening provided;

the center of the second end cover which faces the spindle has a thread hole provided thereon, the thread hole matching a periphery thread of the circular toothed ring;

the external teeth which match the internal teeth of the circular toothed ring are provided at an end of the torsion bar, and the circular toothed ring being screwed in the thread hole of the second end cover.

3. The winder used for a force limiting safety belt of claim 2, wherein the end cover is in a flat cylinder shape, the periphery of the end cover having external teeth provided thereon, the external teeth being engaged with the internal teeth on the sidewalls of the winder frame; the circular toothed ring and the second end cover being installed into an assembly by means of coupling of the internal screw thread of the second end cover and the external screw thread of the circular toothed ring.

4. The winder used for a force limiting safety belt of claim 1, wherein the end cover is in a flat cylinder shape, the periphery of the end cover having external teeth provided thereon, the external teeth being engaged with the internal teeth on the sidewalls of the winder frame; the end cover further comprises a circular toothed ring, the circular toothed ring having an external thread along its periphery and internal teeth in the internal opening; the center of the side of the end cover which faces the spindle also has a thread hole provided thereon, the screw thread hole matching the peripheral thread on the circular toothed ring, the circular toothed ring and the end cover being installed into an assembly by means of coupling of the internal screw thread and the external screw thread.

* * * * *